US012725772B2

(12) United States Patent
Micklitsch et al.

(10) Patent No.: US 12,725,772 B2
(45) Date of Patent: Sep. 1, 2026

(54) SAMPLING DEVICES WITH ESSENTIALLY IMPERMEABLE AND NON-POROUS RESERVOIR SURFACES

(71) Applicant: RESTEK CORPORATION, Bellefonte, PA (US)

(72) Inventors: Ryan D. Micklitsch, Jersey Shore, PA (US); Diego Lopez Lopez, State College, PA (US); Thomas E. Kane, Bellefonte, PA (US); German A. Gomez-Rios, San Jose, CA (US)

(73) Assignee: Restek Corporation, Bellefonte, PA (US)

( * ) Notice: Subject to any disclaimer, the term of this patent is extended or adjusted under 35 U.S.C. 154(b) by 312 days.

(21) Appl. No.: 18/695,620

(22) PCT Filed: Oct. 7, 2022

(86) PCT No.: PCT/US2022/077744
§ 371 (c)(1),
(2) Date: Mar. 26, 2024

(87) PCT Pub. No.: WO2023/060225
PCT Pub. Date: Apr. 13, 2023

(65) Prior Publication Data

US 2025/0125137 A1 Apr. 17, 2025

Related U.S. Application Data

(60) Provisional application No. 63/253,258, filed on Oct. 7, 2021.

(51) Int. Cl.
*H01J 49/16* (2006.01)
*H01J 49/04* (2006.01)

(52) U.S. Cl.
CPC ........ *H01J 49/167* (2013.01); *H01J 49/0404* (2013.01)

(58) Field of Classification Search
CPC .......... H01J 49/00; H01J 49/02; H01J 49/167; H01J 49/0404
(Continued)

(56) References Cited

U.S. PATENT DOCUMENTS

2004/0119010 A1* 6/2004 Perryman .......... G01N 33/6848 250/281
2008/0152509 A1* 6/2008 Chang .................. F04B 43/043 417/51
(Continued)

FOREIGN PATENT DOCUMENTS

CN 110931344 A 3/2020

OTHER PUBLICATIONS

So Pui-Kin et al. "Simple Fabrication of Solid- Phase Microextraction with Surface Coated Aluminum Foil for Enhanced Detection of Analytes in Biological and Clinical Samples by Mass Spectrometry" Analytical Chemistry vol. 19, No. 15, Jul. 8, 2019 (Jul. 8, 2019), pp. 9430-9434.
(Continued)

*Primary Examiner* — Jason L Mccormack
(74) *Attorney, Agent, or Firm* — McNees Wallace & Nurick LLC

(57) ABSTRACT

A sampling device is disclosed, including a substrate, a reservoir surface disposed on at least a portion of the substrate and configured to retain a liquid, the reservoir surface having a reservoir surface area and being formed of a reservoir surface material, and a Taylor cone emitter portion. The reservoir surface is essentially impermeable. The reservoir surface is essentially non-porous. The sampling device has a decreased loading time to target analyte
(Continued)

saturation relative to an otherwise identical comparative sampling device having at least one of a permeable reservoir surface or a porous reservoir surface.

20 Claims, 9 Drawing Sheets

(58) Field of Classification Search
USPC .......................................... 250/281, 282, 288
See application file for complete search history.

(56) References Cited

U.S. PATENT DOCUMENTS

| | | | | |
|---|---|---|---|---|
| 2011/0000986 | A1 | 1/2011 | Syms | |
| 2020/0360918 | A1 | 11/2020 | Chen et al. | |
| 2021/0106739 | A1 * | 4/2021 | Mullon | B01D 69/02 |
| 2021/0156767 | A1 | 5/2021 | Pawliszyn et al. | |

OTHER PUBLICATIONS

Hu Bin et al. "Electrospray ionization with aluminum foil: A versatile mass spectrometric technique", Alalytica Chimica Acta, Elsevier, Amsterdam, NL, vol. 817, Feb. 10, 2014 (Feb. 10, 2014), pp. 1-8.

* cited by examiner

SAMPLING DEVICES WITH ESSENTIALLY IMPERMEABLE AND NON-POROUS RESERVOIR SURFACES

RELATED APPLICATIONS

This application claims the benefit of and priority to U.S. Provisional Patent Application No. 63/253,258, filed Oct. 7, 2021, entitled "Sampling Preparation Devices for Analytical Instrumentation and Methods for Analyzing a Sample," which is hereby incorporated by reference in its entirety.

FIELD OF THE INVENTION

This application is directed to sampling devices. In particular, this application is directed to sampling devices with essentially impermeable and non-porous reservoir surfaces.

BACKGROUND OF THE INVENTION

Taylor Cone Emitter Devices

Taylor cone emitter devices are devices capable of creating a Taylor cone in the presence of a liquid and under the influence of an electric field. The Taylor cone may contain the chemical analyte species of interest. Known Taylor cone emitter devices include coated electrospray needles, coated blade spray devices (described below), sorbent coated electrodes, SPME tips, and porous formed probes, among others. Taylor cone emitters include at least one material capable of generating an electric field. In some cases, a liquid applied to the Taylor cone emitter serves as the layer generating the electric field.

"Electrical surface charges" are charges generated on a surface when a voltage is applied to the emitter or conductor. Surface charge concentrates at regions with the highest curvature. Therefore, sharp edges or pointed tips are used to increase the local charge density. The electric field on the surface (which may be metallic, polymeric, or other) results from the surface charge and is perpendicular to the surface, and its strength is proportional to the surface charge density. The electric field gradient is the rate at which the electric field falls off, and it is strongest on such edges and lines and points. Regions of high electric field gradient are most likely to generate Taylor cones from applied solvent.

Typically, the Taylor cone is localized in a specific region of the emitter where the cone released from the emitter is positioned to facilitate collection of ionized molecules generated from the cone into a mass spectrometer or other ionized particle analyzer. To localize Taylor cones, the emitter device shapes typically include regions having a small radius of curvature, such as sharp points or edges. Localized electric fields are also achieved with protrusions having thin cross sections, narrow diameters, or high aspect ratios as in the case of rods or cones. The degree of sharpness at an edge or point of a surface may be quantified as the radius of curvature of the edge or point. Commercial Taylor cone emitter devices are manufactured from stainless steel, with a nominal thickness of 0.015 inches (381 μm), although thinner and thicker embodiments may also be used. Commercially available Taylor cone emitter devices have radii of curvature of 10-150 μm. Post processing steps may be employed to decrease the radius of curvature. Follow-on grinding or polishing may create a "razor-sharp" edge. These degrees of sharpness have been measured to have a radius of curvature as low as 2 μm.

Taylor cone emitters may be produced from a single material (substrate) or more than one material in the form of layers or coatings where at least a portion of the uppermost surface serves to collect and release analyte compounds.

Suitable analyte collection materials may collect chemical analytes from a bulk sample. The collection mechanism may be adsorption, dissolution, absorption, or specific binding (e.g., antigen-antibody binding, pore shape and size selection such as metal organic frameworks).

The native uppermost surface of the emitter may serve as an analyte collection material, or analyte collection material may be applied to the uppermost surface. Known applied materials include sorbent beds created with particles and irregular or conformal contiguous coatings. The analyte collection material is typically porous, permeable, or both. Typically, the collection material is chemically compatible with the sample and the solvent employed to product the Taylor cone. Preferably, the sample only comes into physical contact with the analyte collection material.

In cases where the analyte collection material incompletely covers the uppermost surface of the emitter, the uppermost surface of the emitter preferably does not interact with analytes of interest. In cases where the uppermost surface of the emitter is not also the analyte collection material, a protective coating or primer layer is applied between the substrate uppermost surface and the analyte collecting material. This protective coating may be polymeric or a direct chemical passivation of the emitter surface.

Coated Blade Devices

Coated Blade Spray ("CBS") is a solid phase microextraction ("SPME")-based analytical technology previously described in the literature (Pawliszyn et al.; U.S. Pat. No. 9,733,234) that facilitates collection of analytes of interest from a sample and the subsequent direct interface to mass spectrometry systems via a substrate spray event (i.e., electrospray ionization). Solid phase microextraction devices are a form of Taylor cone emitter device typically characterized by having a substrate suitable for retaining a sample. CBS devices typically have regions having a small radius of curvature, such as sharp points or edges.

"Coated blade spray," "CBS blade," and "blade device" are used synonymously herein. CBS blades may include, but are not limited to, magnetic CBS blades and immunoaffinity blades.

There are two basic stages to CBS-based chemical analysis: (1) analyte collection followed by (2) instrumental analysis. Analyte collection is performed by immersing the sorbent-coated end of the blade device directly into the sample. For liquid samples, the extraction step is generally performed with the sample contained in a vial or well plate.

After analyte collection, the blade device is removed from the sample, and, following a series of rinsing steps, the blade device is then presented to the inlet of the mass spectrometer ("MS") for analysis. In this fashion, the blade device undergoes several transfer steps. Reliable positioning of the blade device for each of these steps is therefore important, both for manual and robotic automation handling circumstances.

As a direct-to-MS chemical analysis device, the blade device requires a pre-wetting of the extraction material so as to release the collected analytes and facilitate the electrospray ionization process (formation of a Taylor cone). Subsequently, a differential potential is applied between the non-coated area of the substrate and the inlet of the MS system, generating an electrospray at the tip of the CBS device. The electric field between the blade and the MS system must be reproducibly created in order to ensure reliable run-to-run precision. Proper positioning of the blade device with respect to the MS inlet is therefore very important, including the radial (or rotational) orientation of the blade device.

MS Analysis

In recent years, several new direct-to-MS technologies have been developed aiming to shorten analysis turnaround time ("TAT"), which, in the case of clinical analysis, is the time it takes from the reception of the sample by the analyst to the delivery of the analytical result to the physician. Among this new set of technologies, MS technologies without the use of a chromatographic separation step and a sample preparation step have proven to be the most successful in TAT reduction. However, most of these technologies are limited with respect to quantitation and robustness of the instrumentation over time. One approach taken, aiming to improve sensitivity at the expense of time, is the use of simple sample preparation approaches prior to the direct interface with mass spectrometry. Among the sample preparation tactics explored so far, those that can be easily miniaturized have been the most efficient. Analyte collection/extraction may be performed either onto a liquid phase extracting material (e.g., an organic solvent) or onto a solid phase extracting material (e.g., a polymeric material). In the case of extracting materials in solid phase, micro-solid phase extraction ("μSPE"), disperse solid phase extraction ("dSPE"), magnetic solid phase extraction ("mSPE"), open bed SPE ("oSPE"), solid phase microextraction ("SPME") and magnetic SPME ("mSPME") have been most commonly used strategies. There is not always a clear technical differentiation between oSPE and SPME methods, or between magnetic mSPME and mSPE methods. Herein, SPME, μSPE, mSPME, and mSPE are therefore used synonymously.

SPME directly interfaced with mass spectrometry instrumentation has surged as means to improve the performance of either existing direct-to-MS technologies or SPME methods directly hyphened with MS via chromatographic separations. When compared to chromatographically based methods, direct-to-MS couplings typically focused on improving at least one of turnaround time, sensitivity, simplicity, or cost-per-sample.

Limitations of Coated Blade Spray with MS Analysis

MS instruments are becoming more and more sensitive and, consequently, smaller amounts of analyte are needed to be injected onto these instruments in order to comply with the limits of quantitation ("LOQ") required by most methods. In fact, most analytical methods commercially available deal with either diluting the sample prior to injection or splitting the analyte injected onto the instrument in order to avoid detector saturation issues. Thus, sampling/sample preparation technologies that rapidly (<1 s) and efficiently (>70% of the amount extracted) inject the majority of the target analytes collected on the device onto the analytical instrument of interest are an unmet need.

Microextraction techniques typically excel in comparison to exhaustive techniques, such as QUECHERs, by delivering a larger amount of analyte to the instrument detector per unit of time. In order for this to hold true, most of the analyte must be eluted and efficiently transferred to the inlet of the detection system. Mechanisms to focus the amount of analyte on the eluent have been developed and extensively reviewed in the literature. For instance, in the case of thermal desorption, cryo-traps are used to focus the peak of analyte injected onto the GC system. In the case of solvent desorption, low elution volumes (i.e., <100 μL) and large injection volumes (i.e., 5-20 μL) are typically used to enhance sensitivity. The ultimate goal of either approach is to achieve high enrichment factors and minimize analyte losses during the transition from the sampling device to the detector.

Enrichment Factor ("EF") is hereinafter defined as the ratio between the amount of analyte on the sampling device divided by the amount of analyte on the original sample matrix (i.e., $EF=C_{samplingdevice}/C_{sample}$). Efficient miniature sample preparation devices would collect the maximum amount of analyte from the matrix and would release the majority of said analyte during the desorption process. The analytical process with CBS requires the desorption of the analytes extracted on a minute amount of solvent (i.e., <20 μL) with high affinity for said analytes prior to the electrospray event. This is not the case with state of the art CBS devices as only a portion of the analyte collected on the blade is released to the elution solvent. Furthermore, in the case of small sample volumes, such as droplets, given that the desorption volume used to perform the instrumental analysis is equal or larger than the sample volume placed on the coated area (i.e., 2.5-10 μL of elution solvent, versus 1-20 μL of sample), the analyte buildup in the coating is diluted when performing the desorption process. As a result, the enrichment factor is lower than 1, even if an exhaustive extraction is performed during the analyte collection step.

CBS-like devices provide a better signal-to-noise ratio, when compared to dilute and shoot protocols, by virtue of molar fraction enrichment delivered by the coating. Molar fraction ($x_i$) is herein defined as the amount of a constituent $n_i$, divided by the total amount of all constituents in a mixture, $n_{tot}$ (i.e., $x_i=n_i/n_{tot}$). In the case of blood samples, for example, the total constituents comprise salts ("$n_{salt}$"), plasma proteins ("$n_{proteins}$"), erythrocytes ("$n_e$"), leucocytes ("$n_l$"), platelets ("$n_{plat}$"), metabolites ("$n_{met}$"), and the analytes of interest (e.g., a given pharmaceutical compound, $n_i$). As a result, not equals to the sum of the molar contribution of both small ("$n_{small}$") and large molecules ("$n_{large}$"). SPME devices, such as CBS, are essentially tailored to extract small molecules present on a given matrix, while excluding most cellular content ($n_e$, $n_l$, $n_{plat}$), macromolecules ("$n_{proteins}$"), and salts ("$n_{salt}$") that may interfere during the instrumental analysis (i.e., sample clean-up). As a result, the molar fraction of a given analyte on the solvent extract ($x_{i\text{-}extract}$) is larger than the molar fraction of the analyte on the original matrix ($x_{i\text{-}matrix}$) given that the $n_{tot}$ on the extractive material is considerably smaller than on the matrix. Succinctly, when compared to direct other sample to mass spectrometry techniques (i.e., paper-spray, touch-spray, or probe-electrospray-ionization), CBS devices enrich the analytes of interest by excluding most matrix components. Therefore, a larger $x_{i\text{-}extract}$ is critical to have a better sensitivity, as the competition for ionization of the analytes of interest with other matrix constituents is minimized. In this sense, not only CBS, but also other sample preparation techniques directly coupled to mass spectrometry, are unquestionably one step ahead of direct sample to MS technologies.

Given that most sample preparation devices currently used in direct-to-MS applications were designed having chromatography in mind, a good percentage suffer from device carry-over due to the inefficient elution of the analytes of interest under the ultra-fast elution conditions that are typically used on direct-to-MS technologies. CBS is one of these technologies and, as shown in FIG. 1, 2% or less of the analyte collected on the devices is eluted even when using best desorption conditions. Furthermore, as shown in FIG. 2, even when using longer elution times, LC-MS data demonstrates that it takes about two hundred seconds for the majority of analyte to get out of the coating. Elution times over 2 minutes drastically impact the turnaround time of sampling analysis method and may make these devices unpractical for clinical diagnostics, point-of-care applications, and food safety applications. Likewise, elution volumes over 20 μL are simply not suitable for CBS devices as these would overload the coated area and make the technology prone to higher variability.

In addition, due to the hydrophobic nature of the binders currently use to coat commercial SPME and CBS devices, CBS in general have a poor interaction and retention in the extraction of very polar compounds. An alternative to improve the collection of polar analytes is to prepare hydrophilic sorbents by copolymerizing monomers containing suitable functional groups or by introducing larger quantities of a functional group to the existing hydrophobic polymers or polymer-binder combinations.

In most instances, microextraction devices, such as CBS, do not perform exhaustive extraction of the target analytes. In fact, analyte collection in microextraction technologies is based on partitioning (i.e., affinity of the extraction material for the target analyte is a constant until the device is saturated). Recent research has shown that, although the addition of matrix modifier (e.g., a mixture of an organic solvent with solvent buffer) may be used to liberate bound analytes and increase the amount of analyte collected on the CBS device, it rarely leads to exhaustive analyte collection.

BRIEF DESCRIPTION OF THE INVENTION

In one exemplary embodiment, a sampling device includes a substrate, a reservoir surface disposed on at least a portion of the substrate and configured to retain a liquid, the reservoir surface having a reservoir surface area and being formed of a reservoir surface material, and a Taylor cone emitter portion. The reservoir surface is essentially impermeable. The reservoir surface is essentially non-porous. The sampling device has a decreased loading time to target analyte saturation relative to an otherwise identical comparative sampling device having at least one of a permeable reservoir surface or a porous reservoir surface.

BRIEF DESCRIPTION OF THE DRAWINGS

Wherever possible, the same reference numbers will be used throughout the drawings to represent the same parts.

DETAILED DESCRIPTION OF THE INVENTION

Figure 1:
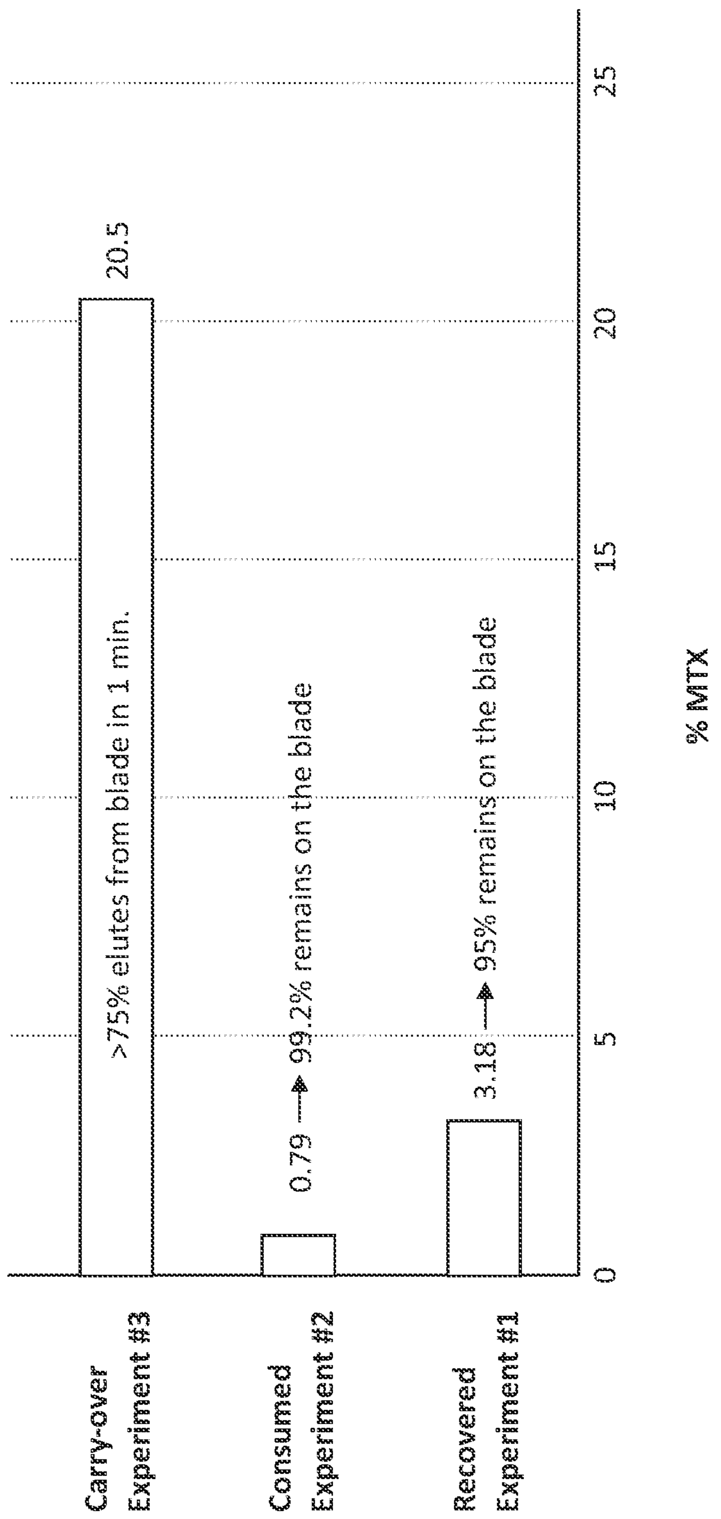
FIG. 1 illustrates target analyte elution during typical MS analysis with coated blade spray.

In comparison to devices lacking at least one of the features described herein, the devices of the present embodiments decrease loading time to target analyte saturation relative, decreased elution time to target analyte exhaustion, decrease analysis time, increase analysis efficiency, or combinations thereof.

As used herein, "about" indicates a variance of ±20% of the value being modified by "about," unless otherwise indicated to the contrary.

As used herein, "Taylor cone emitter" includes, but is not limited to, an article capable of forming a Taylor cone, including, but not limited to, a solid phase microextraction device or a CBS device. A solid phase microextraction device is a form of a Taylor cone emitter device, but not all Taylor cone emitter devices are solid phase microextraction devices.

"Analytes of interest" should be understood as any analyte collected on or extracted by the Taylor cone emitter device. In some examples, the analytes of interest are not targeted (i.e., are not explicitly monitored during the selection/detection steps in the mass spectrometer analyzer). "Analyte of interest," "target analyte" ("TA") and "compound of interest" should be understood to be synonymous. In some embodiments, a compound of interest may be a "chemical of interest" or a "molecule of interest" or a "molecular tag."

The expressions "analyte collection," "analyte extraction," "analyte enrichment," and "analyte loading" are intended to be understood as synonymous terms.

The terms "extractive material," "sorbent," "adsorbent," "absorbent," "polymeric phase," "polymer sorbent," "magnetic particles," "coated magnetic particles," and "functionalized magnetic particles" are intended to refer materials use to collect the analytes of interest.

Suitable analyte collection materials may collect chemical analytes from a bulk sample. The collection mechanism may be adsorption, specific binding (e.g., antigen-antibody binding), or combinations thereof.

As used herein, "solid phase microextraction" includes, but is not limited to, a solid substrate coated with a polymeric sorbent coating, wherein the coating may include metallic particles, silica-based particles, metal-polymeric particles, polymeric particles, or combinations thereof which are physically or chemically attached to the substrate. In some non-limiting examples, the solid substrate has at least one depression disposed in or protrusion disposed on a surface of the substrate and said substrate includes at least one polymeric sorbent coating disposed in or on the at least one depression or protrusion. The term "solid phase microextraction" further includes a solid substrate with at least one indentation or protrusion that contains at least one magnetic component for the collection of magnetic particles or magnetic molecules onto the solid substrate.

The term "analyte injection" should be understood as the act of injecting an ion beam onto a mass spectrometer inlet. "Analyte injection" should be understood as a synonym of "electrospray ionization," "ion ejection," "ion expelling," and "analyte spray."

The terms "skimmer cone" and "curtain plate" are used synonymously.

The terms "mass spectrometer inlet," "inlet," "skimmer cone," "MS injection aperture," and "mass spectrometer front-end" are used herein synonymously.

The Taylor cone emitter may be any suitable material, including, but not limited to, a metal, a metal alloy, a glass, a fabric, a polymer, a polymer metal oxide, or combinations thereof. The emitter substrate may include, by way of non-limiting example, nickel, nitinol, titanium, aluminum, brass, copper, stainless steel, bronze, iron, or combinations thereof. Similarly, the substrate may include any material used for additive manufacturing, 3D printing, lithography, or circuit manufacturing, such as, but not limited to, silicon wafer, glass fiber reinforced polymer ("fiberglass"), polytetrafluoroethylene, polystyrene, conductive polystyrene, polyimide film, polycarbonate-acrylonitrile butadiene styrene ("PC-ABS"), polybutylene terephthalate ("PBT"), polylactic acid, poly (methyl methacrylate), polycarbonate ("PC"), acrylonitrile butadiene styrene ("ABS"), polyetherimide (e.g., ULTEM), polyphenylsulfone ("PPSF"), polycarbonate-ISO ("PC-ISO"), or combinations thereof.

The phrase "excitation voltage" should be understood as the voltage necessary to expel and generate, via electrospray ionization mechanisms or atmospheric pressure chemical ionization mechanisms, a stable beam of ions from the substrate electrospray emitter. Excitation voltage may range from a few volts to hundreds or even thousands of volts depending on multiple variables including Taylor cone emitter composition, location of the Taylor cone emitter in regard to the mass spectrometer inlet and the characteristics of the environment at which the electrospray is generated. The excitation voltage ranges between 0.1V and 8,000 V, alternatively between 1,500 and 5,500 V, alternatively between 2,000 and 4,000 V. The excitation voltage may be delivered by different sources such as an alternating current supply, direct current supply, or combinations thereof. The excitation voltage supply may be constant, pulsed, modulated, or follow any other voltage function. An excitation stage may include applying an excitation voltage to a Taylor cone emitter for a fixed period.

In some examples, the application of the excitation voltage is short enough so to be considered a pulse (<1 s). In other examples, the signal recorded in the mass spectrometer is attained by applying multiple pulses. In particular examples, the pulse may be either rectangular, triangular, saw-tooth, sinusoidal, or combinations thereof. In particular examples, the voltage may be ramped from a lower voltage up to the excitation voltage. In other examples, the voltage may be ramped from a higher voltage down to the excitation voltage. In additional examples, the excitation stage may comprise multiple combinations of ramping up to and down from the excitation voltage. Excitation voltage may be deprived at any point either electronically, or mechanically, or electromechanically. In preferred examples, the excitation voltage is deprived electromechanically, such as high voltage relay.

As used herein, "impermeable" and "non-porous" are both used to indicate that a material does not allow fluid to pass therethrough; however, "impermeable" references interparticle or interphase lack of flow, and "non-porous" indicates intraparticle or intraphase lack of flow. By way of example, a solid gold bar is both impermeable and non-porous, whereas a gold frit covered with wax is porous but impermeable, a bed of loosely aggregated solid gold pebbles is non-porous but permeable, and a bed of loosely aggregated gold frits is both permeable and porous. As used in this context, "essentially" modifying "non-porous" or "impermeable" allows for isolated surface imperfections (relative to porosity) or chemical interactions (relative to impermeability) that do not have a material effect on the bulk porosity or permeability of the material. A material effect is one that increases the adsorptive capacity of a surface by more than 100%. By way of example, if a perfectly non-porous and impermeable surface had a specified surface area that would have the capacity to adsorb 1 μg of water, and instead the surface was able to uptake up to 2 μg of water due to a combination of surface imperfections and chemical interactions, that surface would be considered to be essentially non-porous and essentially impermeable; however, if the surface was able to uptake more than 2 μg of water due to a combination of surface imperfections and chemical interactions, that surface would not be considered to be essentially non-porous and essentially impermeable.

Figures 3A, 3B, 3C:
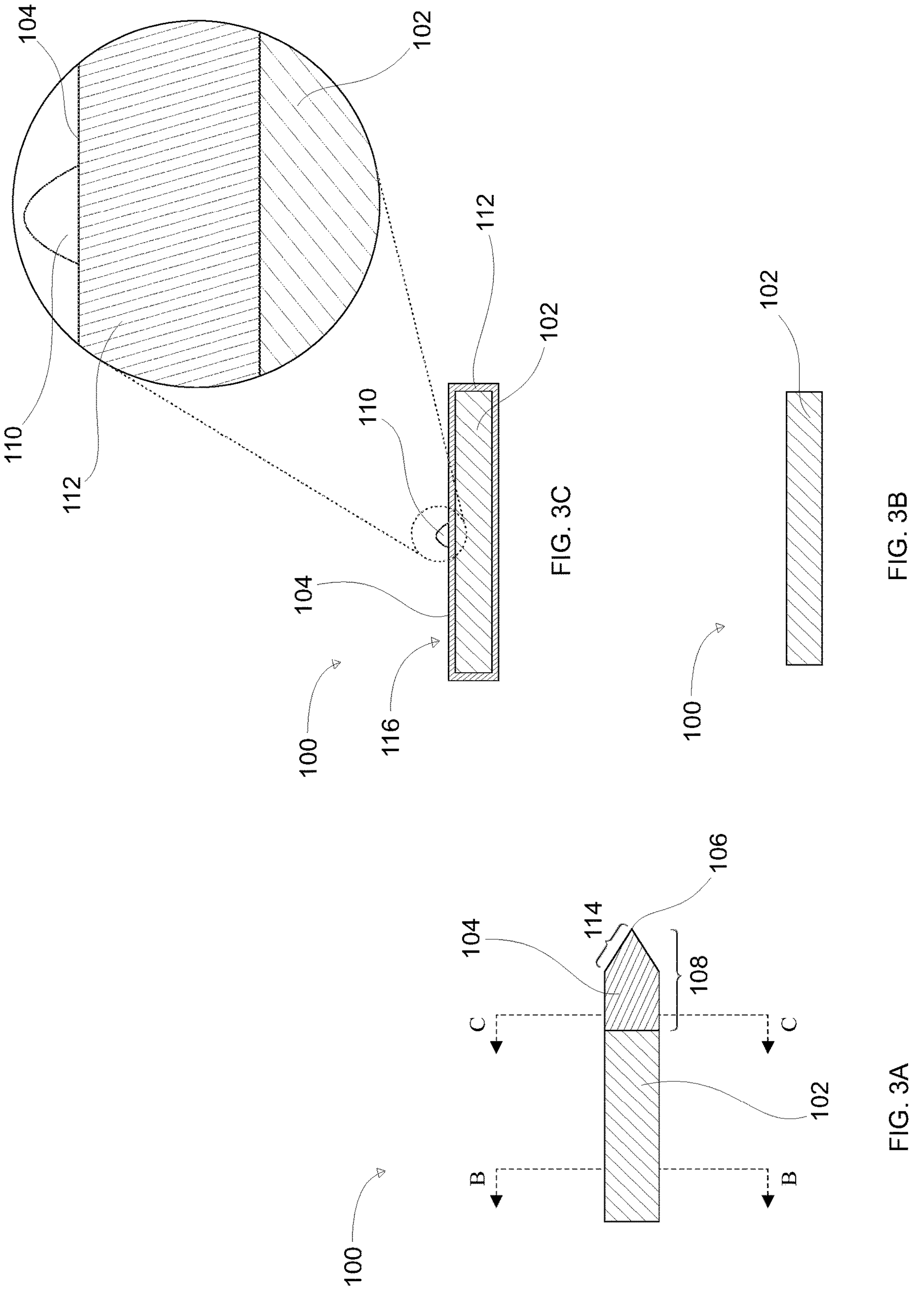
FIG. 3A illustrates a sampling device with an essentially impermeable and essentially non-porous planar reservoir surface, according to an embodiment of the present disclosure.
FIG. 3B is a cross-sectional view of the sampling device of FIG. 3A taken along line B-B, according to an embodiment of the present disclosure.
FIG. 3C is a cross-sectional view of the sampling device of FIG. 3 taken along line C-C, according to an embodiment of the present disclosure.

Referring to FIGS. 3A-3C, in one embodiment, a sampling device 100 includes a substrate 102, a reservoir surface 104, and a Taylor cone emitter portion 106. The reservoir surface 104 is disposed on at least a portion 108 of the substrate 102 and is configured to retain a liquid 110. The reservoir surface 104 has a reservoir surface area and is formed of a reservoir surface material 112. The reservoir surface 104 is essentially impermeable and essentially non-porous, alternatively essentially impermeable and non-porous, alternatively impermeable and essentially non-porous, alternatively impermeable and non-porous. The sampling device 100 has a decreased loading time to target analyte saturation relative to an otherwise identical comparative sampling device having at least one of a permeable reservoir surface or a porous reservoir surface. As used herein, "loading time to target analyte saturation" indicates the time required to fully saturate the reservoir surface 104 with the target analyte, at which time no more target analyte may be absorbed into or adsorbed onto the reservoir surface 104. Decreased loading time to target analyte saturation relative to the otherwise identical comparative sampling device may be referred to as "flash collection."

The sampling device 100 may have a decreased elution time to target analyte exhaustion relative to the otherwise identical comparative sampling device. As used herein, "elution time to target analyte exhaustion" indicates the time required to fully elute all target analyte absorbed into or adsorbed onto the reservoir surface 104 from the reservoir surface 104. Decreased elution time to target analyte exhaustion relative to the otherwise identical comparative sampling device may be referred to as "flash elution."

The elution mechanism may include, but is not limited to, thermal desorption, laser desorption, liquid desorption, or combinations thereof.

In one embodiment, flash elution from the sampling device 100 is completed in less than 10 seconds, alternatively less than 5 seconds, alternatively less than 4 seconds, alternatively less than 3 seconds, alternatively less than 2 seconds, alternatively less than 1 second, alternatively less than 0.5 seconds, alternatively less than 0.1 seconds.

The Taylor cone emitter portion 106 may include a tapering tip 114 extending from the substrate 102 or a broadly curved surface having indicate a radius of curvature of at least 300 μm, as described in PCT Application No. PCT/US2022/031084, which is hereby incorporated herein as if fully restated.

The reservoir surface 104 may be a planar surface 116 (FIG. 3C), a concave surface 118 (FIGS. 4A and 4B), a recessed surface 120 (FIGS. 5A and 5B), a grooved surface 122 (FIGS. 5A and 5B), a mesh surface 124 which may be composed of a plurality of filaments 126 (FIG. 6), a surface including one or more wells, or combinations thereof. As used herein, a "groove" indicates an elongated recess having straight, tapered, or curved sides. The reservoir surface 104 may further include one or more flow modification features 128, including, but not limited to, turbulators, ridges, pins, bumps, curved surfaces, or combinations thereof. The reservoir surface 104 may be configured to feed the liquid 110 to the Taylor cone emitter portion 106 while a Taylor cone is emitted from the Taylor cone emitter portion 106. The reservoir surface 104 may feed the liquid 110 to the Taylor cone emitter portion 106 by any suitable technique, including, but not limited to, gravity feeding, electroosmotic flow, capillary force, or combinations thereof.

The substrate 102 may have any suitable dimensions, including, but not limited to, about 4 mm wide by about 40 mm long by about 0.5 mm thick. The substrate 102 may be made from any suitable material, including, but not limited to, polymers such as, but not limited to, polyaniline, polyphenol, polypyrrole, polythiophene, and composites thereof, and conductive materials such as, but not limited to, stainless steels.

The reservoir surface 104 may be disposed on the at least the portion 108 of the substrate 102 by any suitable technique, including, but not limited to, electrodeposition, electroplating, electrophoretic deposition, underpotential deposition, vapor deposition, dipping, silica sputtering, chemical polymerization, or additive manufacturing.

In one embodiment, the reservoir surface 104 has an effective surface area of less than 200% of the reservoir surface area, alternatively less than 175%, alternatively less than 150%, alternatively less than 125%, alternatively less than 120%, alternatively less than 115%, alternatively less than 110%, alternatively less than 105%, alternatively less than 102%, alternatively less than 101%. As used herein, "reservoir surface area" is the surface area of the reservoir surface 104 calculated based on an ideal assumption that the reservoir surface 104 is impermeable and non-porous, whereas "effective surface area" is the surface area of the reservoir surface 104 including internal surface areas based on fluid accessible interparticle and interphase surfaces of permeable surfaces as well as fluid accessible intraparticle and intraphase surfaces of porous materials. Effective surface area may be calculated based on packing densities of particles and porosity of materials or may be experimentally determined based on measured absorption and adsorption.

Referring to FIGS. 3A- and 7-12, the reservoir surface material 112 may be any suitable material, including, but not limited to, a bulk material layer (FIGS. 3A-C), particles 130 fused directly together (FIG. 7), particles 130 fused together with binder 132 (FIG. 8), a self-assembled monolayer (FIGS. 9-12), a metallic material, a metal oxide, a silica-containing material, a polymer, or combinations thereof. Suitable metallic materials include, but are not limited to, copper, silver, gold, platinum, iron alloys, steel alloys, stainless steel alloys, or combinations thereof. Suitable silica-containing materials include coatings derived from hybrid organic-inorganic silica sources, such as, but not limited to, alkylated-hydrogen silsesquioxanes. Hybrid organic-inorganic silica sources may be deposited by any suitable method, including, but not limited to, chemical vapor deposition, atomic layer deposition, or combinations thereof. Silica-containing materials be further functionalized. Suitable polymers include, but are not limited to, polyaniline, polyphenol, polypyrrole, polythiophene, or combinations thereof.

Polymers may be deposited as a bulk material layer for the reservoir surface material 112 via electropolymerziation in which for the electrochemical deposition of monomers onto a conductive surface, a potential is applied to a working electrode that is immersed in an electrochemical cell containing a monomer, and the electrolyte solution. Under the influence of the electric field generated at the working electrode surface the monomer is electrochemically oxidized to form free radicals that initiate the polymerization process and the deposition of the conducting polymer film. Film physical properties such as thickness, porosity, and hardness may in part be controlled with electrochemical cell factors such as applied potential, electrolyte solution, direction of potential sweep, nature of the monomer, pH, solvent effect, temperature, and the voltametric potential window. Monomers used in electropolymerziation may include, but are not limited to, aniline, 4-aminoindole, carbazole, thiophene, pyrrole, benzene, isothionaphthalene, ithienothiophene, dithienylbenze, ethylenedioxythiophene, phenylenevinylene, bithiophene, thieno [3,2-b]pyrrole, fluorene, and combinations thereof.

Figure 7:
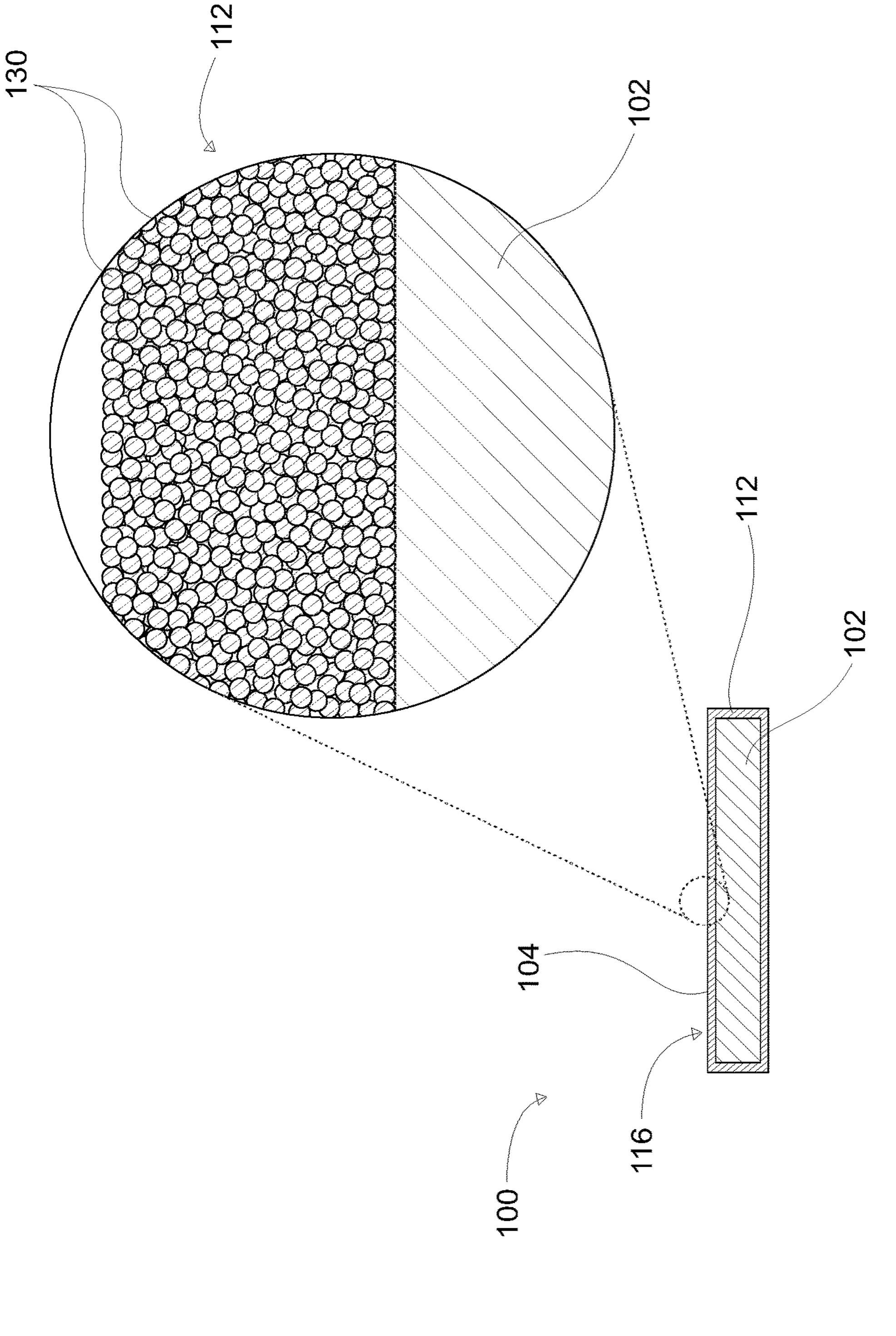
FIG. 7 is a cross-sectional view of a sampling device with an essentially impermeable and essentially non-porous fused particle reservoir surface, according to an embodiment of the present disclosure.
Figure 8:
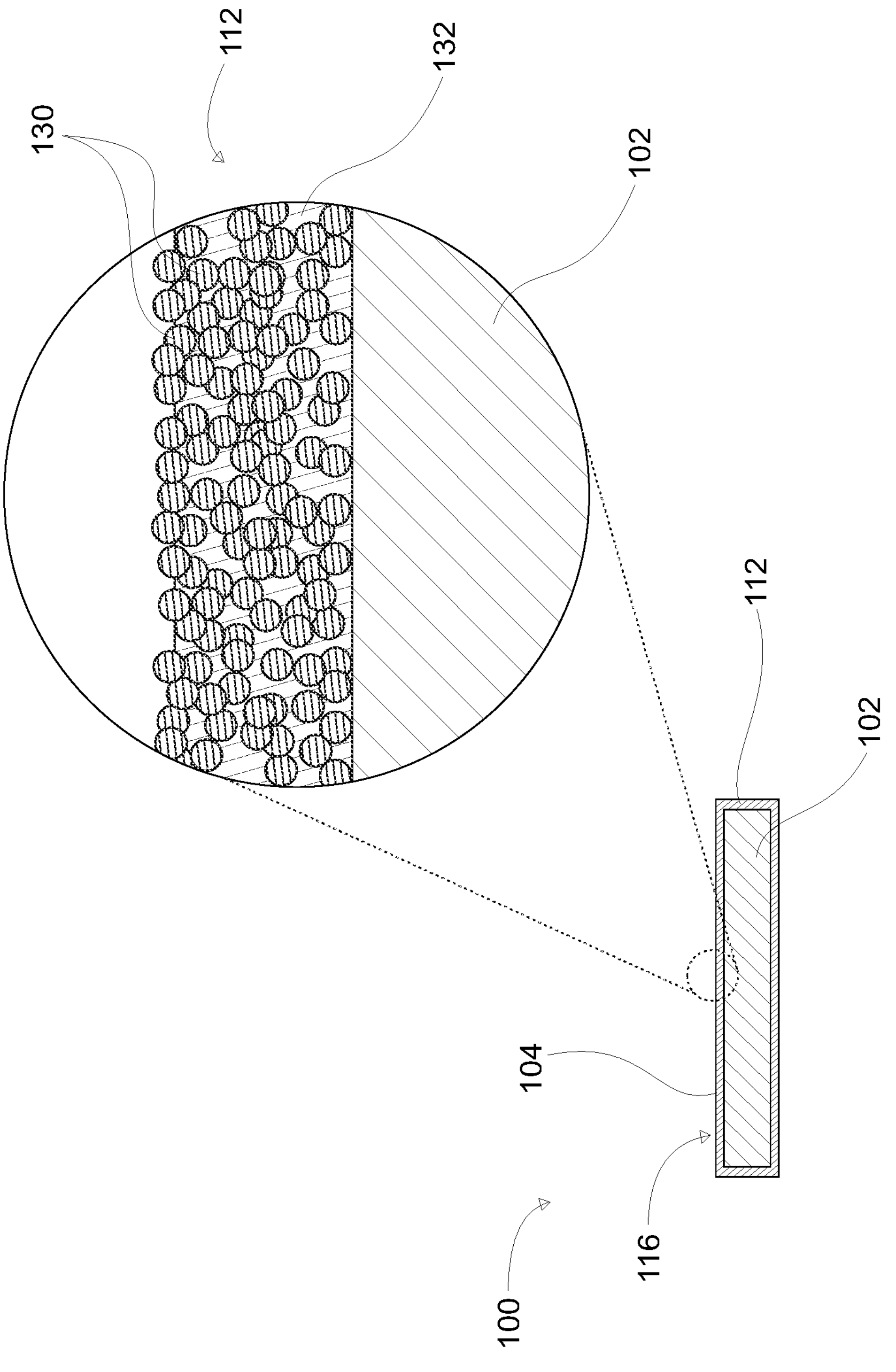
FIG. 8 is a cross-sectional view of a sampling device with an essentially impermeable and essentially non-porous particle with binder reservoir surface, according to an embodiment of the present disclosure.

The reservoir surface material 112 may be a homogenous material or a heterogenous material. Referring to FIG. 7, particles 130 may be directly fused together by any suitable technique, including, but not limited to, sintering. Referring to FIG. 8, suitable binders 132 include, but are not limited to, polyacrylonitrile.

Figure 4A:
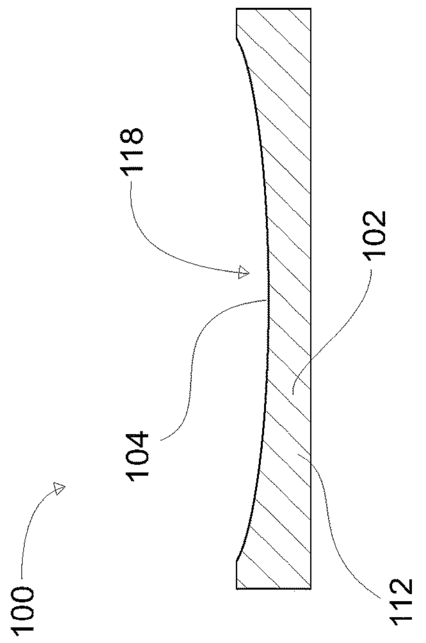
FIG. 4A is a cross-sectional view of a sampling device with an essentially impermeable and essentially non-porous concave reservoir surface, according to an embodiment of the present disclosure.
Figure 4B:
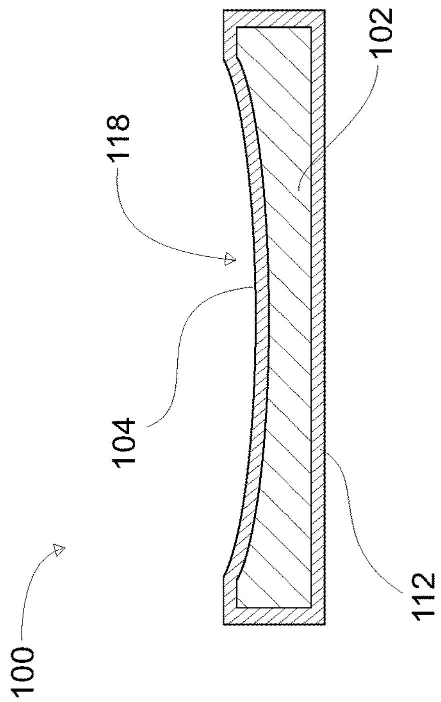
FIG. 4B is a cross-sectional view of a sampling device with an essentially impermeable and essentially non-porous coated concave reservoir surface, according to an embodiment of the present disclosure.
Figure 5A:
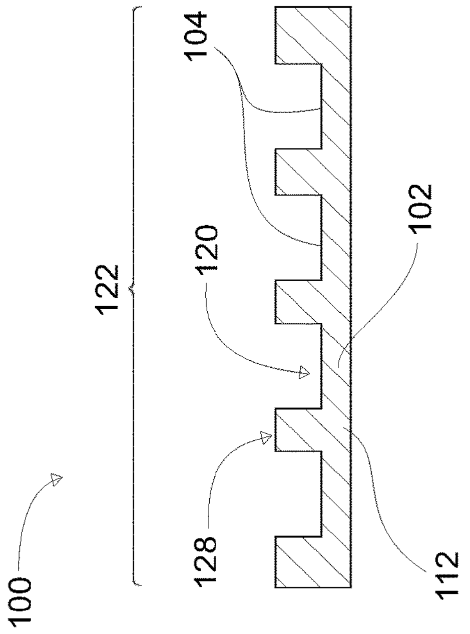
FIG. 5A is a cross-sectional view of a sampling device with an essentially impermeable and essentially non-porous grooved reservoir surface, according to an embodiment of the present disclosure.
Figure 5B:
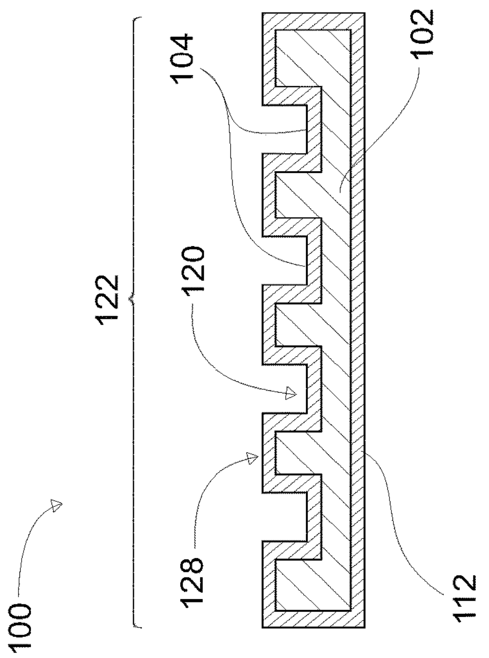
FIG. 5B is a cross-sectional view of a sampling device with an essentially impermeable and essentially non-porous coated grooved reservoir surface, according to an embodiment of the present disclosure.
Figure 6:
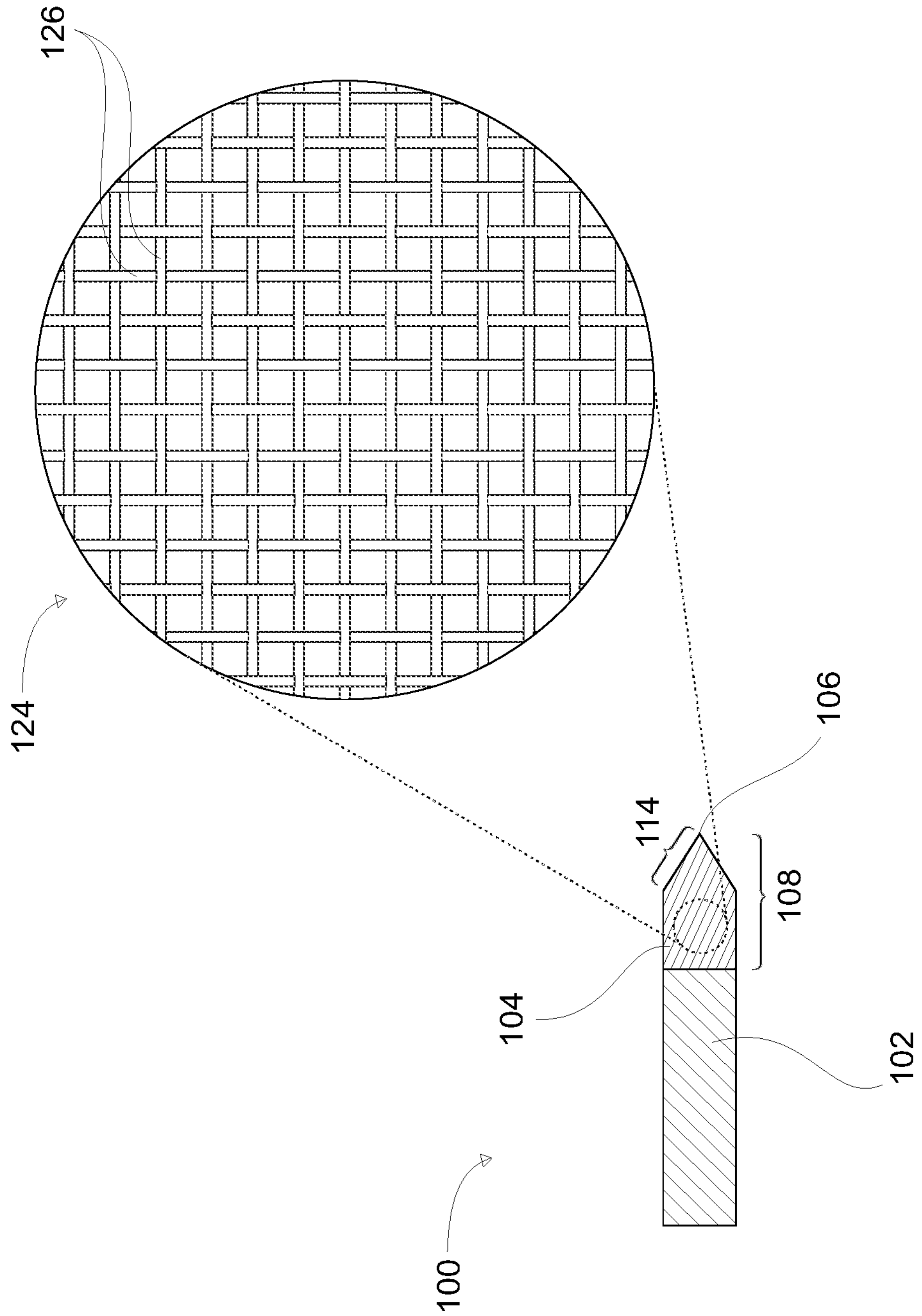
FIG. 6 illustrates a sampling device with an essentially impermeable and non-porous mesh reservoir surface, according to an embodiment of the present disclosure.

The reservoir surface material 112 may have a distinct material composition from the substrate 102 (FIGS. 3B, 4B, 5B, 7, and 8) or may have the same material composition as the substrate 102 such that the substrate 102 is composed of the reservoir surface material 112 (FIGS. 4A and 5A). It is noted that although only explicitly illustrated with respect to FIGS. 4A and 5A, the embodiment of FIGS. 3A-3C may also have a reservoir surface material 112 having the same material composition as the substrate 102 such that the substrate 102 is composed of the reservoir surface material 112, in which embodiment the cross-section of FIG. 3C would instead appear as FIG. 3B.

Referring to FIGS. 9-12, the reservoir surface 104 may be functionalized with any selectivity-enhancing material, including, but not limited to, straight-chain polythiols 134 (FIG. 9), cross-linked polythiols 136 (FIG. 10), moieties having alkyl chains 138 (FIG. 11), capture antibodies for mass spectrometry biosensing 140 (FIG. 12), or combinations thereof. Suitable moieties having alkyl chains include, but are not limited to, moieties having alkyl chains with $CH_2$ chain lengths between 2 to 22, such as, but not limited to, an octadecyl chain. The alkyl chain of the moiety may be bound to the reservoir surface 104 through any suitable functional group, including, but not limited to, a sulfur-based, oxygen-based, carbon-based, or silicon-based functional group. Capture antibodies are derived from an antibody-antigen pairs modified so to accommodate cleavable ionic probes ("mass probes"). Capture antibodies capture antigens from a sample and using a sandwich-type approach liberate small molecules that may be detected on mass spectrometer instruments.

Figure 9:
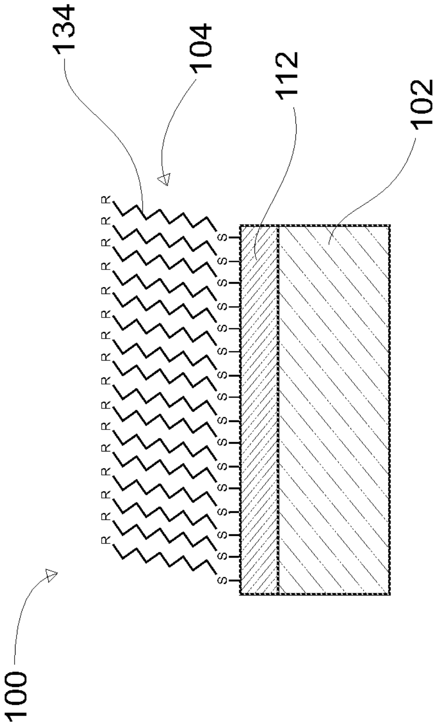
FIG. 9 is a cross-sectional view of a sampling device with an essentially impermeable and non-porous reservoir surface functionalized with straight-chain polythiols, according to an embodiment of the present disclosure.
Figure 10:
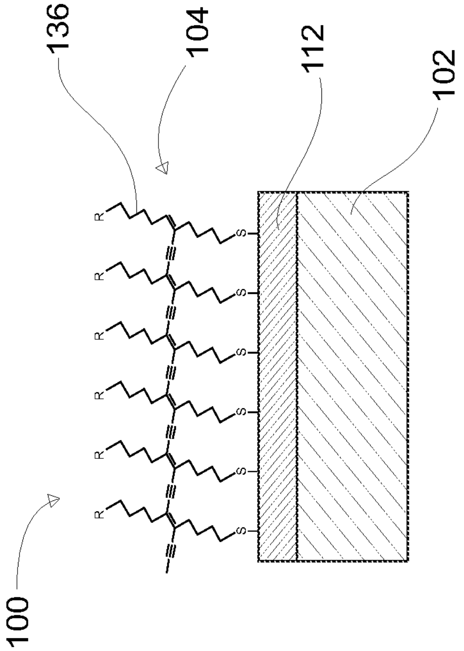
FIG. 10 is a cross-sectional view of a sampling device with an essentially impermeable and non-porous reservoir surface functionalized with crosslinked polythiols, according to an embodiment of the present disclosure.
Figure 11:
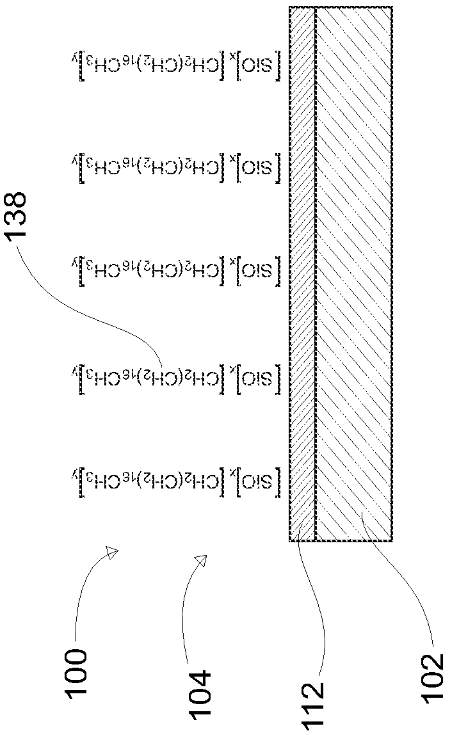
FIG. 11 is a cross-sectional view of a sampling device with an essentially impermeable and non-porous reservoir surface functionalized with octactcyl moieties, according to an embodiment of the present disclosure.
Figure 12:
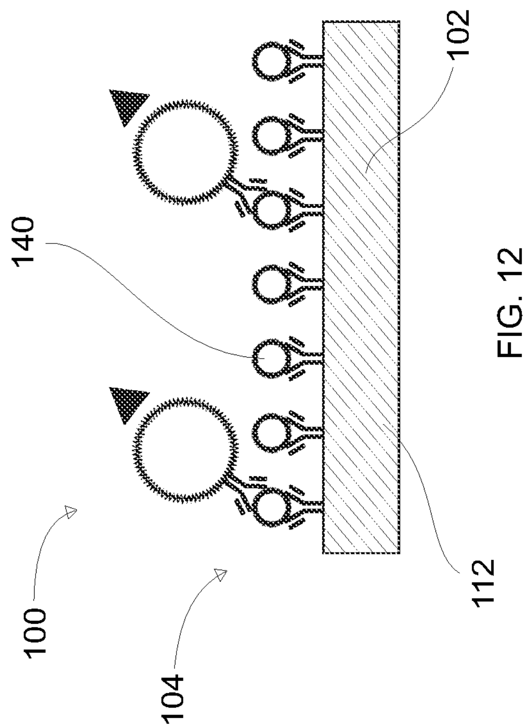
FIG. 12 is a cross-sectional view of a sampling device with an essentially impermeable and non-porous reservoir surface functionalized with capture antibodies, according to an embodiment of the present disclosure.

Referring to FIGS. 9 and 10, in one embodiment, wherein the reservoir surface 104 is functionalized with straight-chain polythiols 134 (FIG. 9) or cross-linked polythiols 136 (FIG. 10), the reservoir surface material 112 is metallic gold. The substrate 102 may be gold or the gold reservoir surface material 112 may be disposed on a substrate 102 having a different material composition. The gold reservoir surface material 112 may be deposited by any suitable technique, including, but not limited to, sputtering, electrodeposition, dip coating, or combinations thereof.

Stable, well organized monolayer films may be formed on polycrystalline gold when alkanethiolates are immersed in dilute alkanethiol solutions in ethanol. The alkyl chains are stabilized by van der Waals forces. The thicknesses of alkanethiolates monolayers generally range from 1 nm to 5 nm, depending on the methylene chain length of the thiolate backbone, and the size of any terminal groups. The S—Au bond forms preferentially in the presence of other competing terminal chain functionalities. The general chemical structure for thiol monomers having a distinct terminal group is given as $HS\text{-}(R)_nX$, where R may comprise species having the molecular formula ($CH_2$) and X is the terminal functional group. Examples of terminal groups investigated include —OH, —$NH_2$, —Phenyl, —CN, and —COOH. In addition to simple end groups, the terminal R group may also be larger sized polymers having adsorbent properties. Alternatively, functional groups (Y) within the methylene chain backbone $HS\text{-}(R)_n(Y)_o(R)_m$, or $HS\text{-}(R)_n(Y)_o(R)_mX$ may also form suitable monolayers.

EXAMPLES

Referring to FIG. 1, coated blade spray extractions from serum samples spiked with 50 ng/ml of methotrexate ("MTX") were performed with permeable and porous blade devices. After analyte collection, one set of blade devices was run via LC-MS/MS (i.e., elution of the blade devices on 200 μL of methanol for 1 min) to calculate the recovery amount. Less than 5% of the amount spiked was collected on the blade devices, leaving over 96% on the matrix. Then, a separate set of blade devices (i.e., Experiment #2) were run first as a CBS-MS/MS (i.e., 5 μL elution volume, 2 s elution time, 5 s electrospray at 2,750 V) and, subsequently, the blade devices were eluted for LC-MS/MS analysis using the conditions abovementioned. Results showed that, when compared to blade devices from Experiment #1, less than 1% of the analyte collected on the blades was sprayed into the mass spectrometer inlet during the CBS-MS/MS experiment. Further, a third experiment, showed that if blade devices from Experiment #2 were eluted for a second LC-MS/MS analysis (i.e., elution of the blade devices on 200 μL of methanol for 1 min), there was at least 20.5% of the first amount eluted still lingering at the coating. These results evidence that, in spite of the low amount collected on the blade devices, CBS may indeed deliver quantitative results. Furthermore, given than less than 1% of the analyte is used during the electrospray process, there is plenty of analyte for other CBS analysis or even a confirmation test (e.g., via LC-MS/MS). The results evidence that the elution process is the bottleneck of the process and better results may be potentially attained if more analyte eluted out of the blade devices per unit of time.

Figure 2:
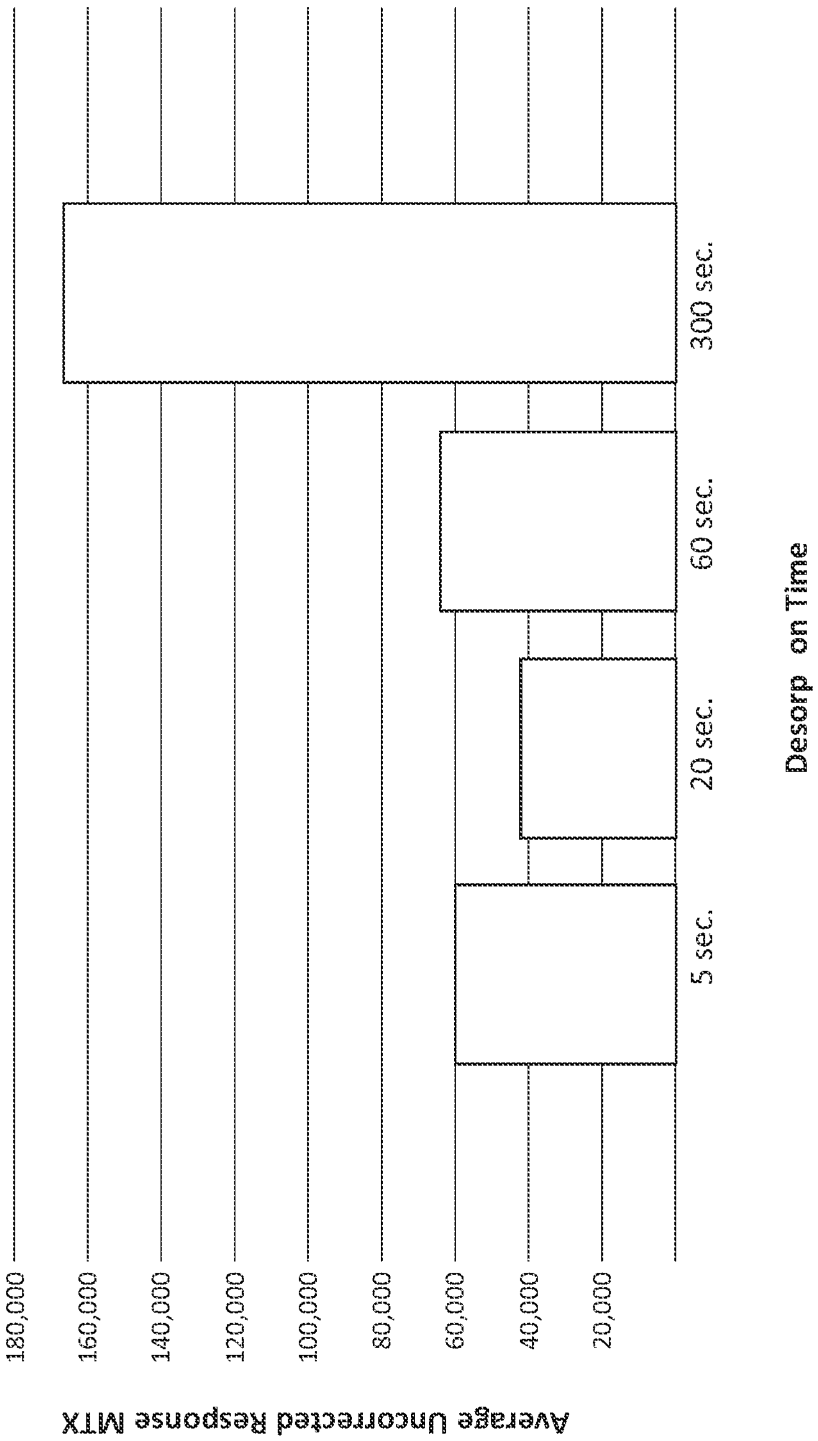
FIG. 2 illustrates target analyte elution time from coated blade spray.

Referring to FIG. 2, extractions from serum samples spiked with 50 ng/ml of MTX with commercially available permeable and porous blade devices as described in U.S. Pat. No. 9,733,234 B2 were performed. After analyte collection, blade devices were run via LC-MS/MS. The elution of the blade devices on 200 μL of methanol was performed using different elution times: 5 s, 20 s, 60 s, and 300 s. No significant differences were observed between 5 s and 60 s. These results evidence that even after 1 minute of interaction between the coating and the elution solvent, a great percentage of the analyte still remains on the extracting phase.

Figure 13:
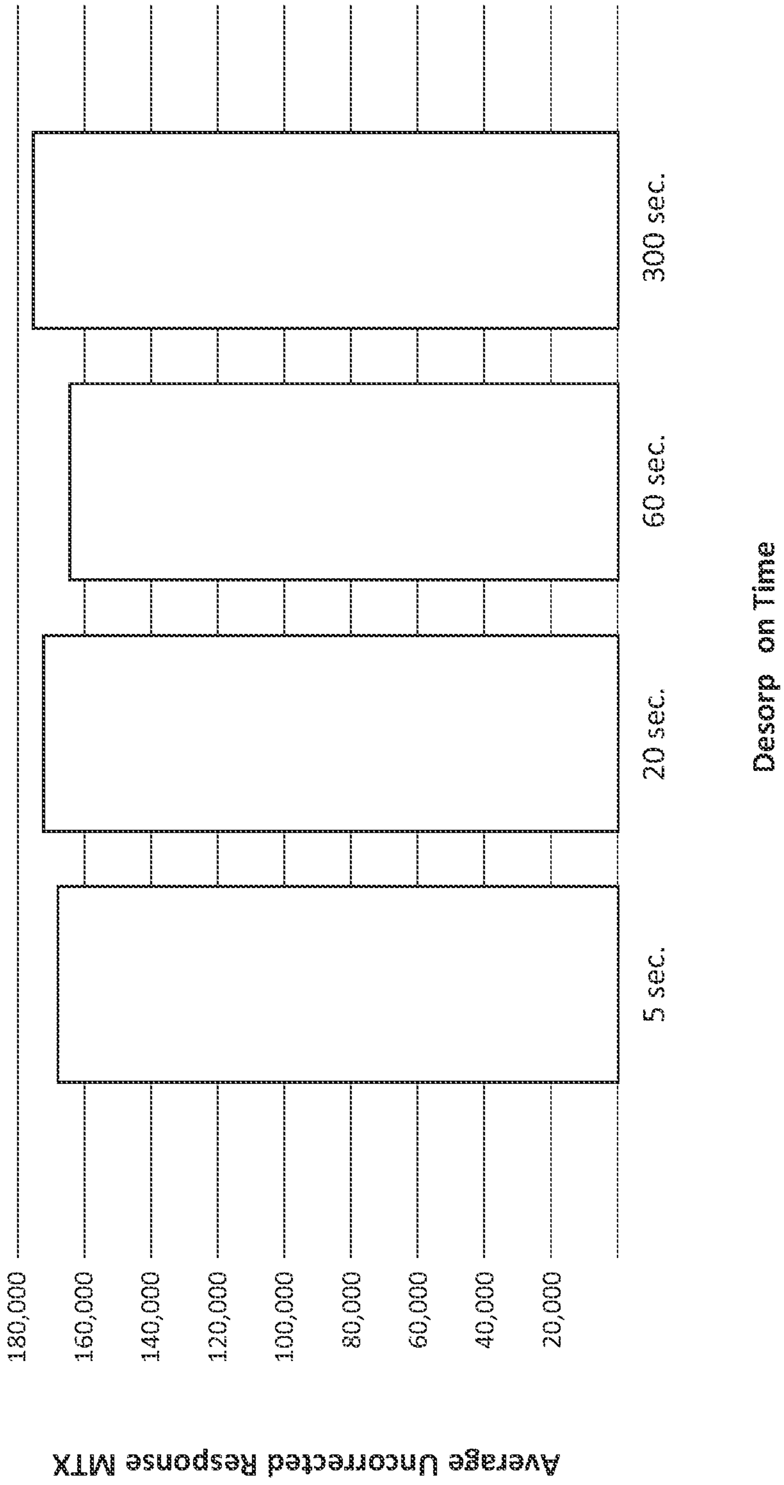
FIG. 13 illustrates target analyte elution from a coated blade spray with an essentially impermeable and non-porous reservoir surface, according to an embodiment of the present disclosure.

Referring to FIG. 13, extractions from serum samples spiked with 50 ng/ml of MTX with impermeable and non-porous blade devices (wherein the liquid was disposed on an impermeable and non-porous reservoir surface 104). The reservoir surface material 112 of the impermeable and non-porous blade devices was a coating formed from alkylated-hydrogen silsesquioxane with planar morphology. After analyte collection, the blade devices were run via LC-MS/MS. The elution of the blade devices on 200 μL of methanol was performed using different elution times: 5 s, 20 s, 60 s, and 300 s. Impermeable and non-porous blade devices led to non-statistical differences independent of the elution time, hence reaching flash exhaustive elution in less than 5 seconds.

Therefore, surprisingly, it has been found that replacing a state of the art sampling device having a permeable and porous reservoir surface with a sampling device according to embodiments of the present invention having a reservoir surface that is essentially impermeable and essentially non-porous achieves quantitative analytical results in less than 5 seconds, as compared to an analysis time for consistent quantitative results of over 5 minutes or the state of the art sampling device.

When comparing blade devices having porous and/or permeable coatings, a standard unit of measurement has been specific surface area, which is the total surface area of a material per unit of mass ($m^2/kg$ or $m^2/g$). By way of example, cosmetics-grade talcum powder has an initial median particle size of about 0.5 μm to about 10 μm and a density of 2.7 g/cc has a specific surface area of about 5 $m^2/g$ to about 20 $m^2/g$, spherical porous silica having particle diameters of about 2 um to 10 um used for chromatography typically have a specific surface area of about 300 $m^2/g$ to about 400 $m^2/g$. Activated carbon particles are highly porous and may exhibit specific surface area values greater than 1,000 $m^2/g$. However, while this unit of measurement may have previously been useful, this unit of measurement is not utilized with respect to the present sampling devices, because due to the essentially non-porous and essentially impermeable nature of the present sampling devices, the thickness of the reservoir coating loses its importance, and a comparison of surface area to the weight and therefore the thickness of the present reservoir surfaces becomes meaningless.

While the foregoing specification illustrates and describes exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A sampling device, comprising:

a substrate;

a reservoir surface disposed on at least a portion of the substrate and configured to retain a liquid, the reservoir surface having a reservoir surface area and being formed of a reservoir surface material; and a Taylor cone emitter portion, wherein:

the reservoir surface is essentially impermeable;

the reservoir surface is essentially non-porous; and the sampling device has a decreased loading time to target analyte saturation relative to an otherwise identical comparative sampling device having at least one of a permeable reservoir surface or a porous reservoir surface.

2. The sampling device of claim 1, further having a decreased elution time to target analyte exhaustion relative to the otherwise identical comparative sampling device.

3. The sampling device of claim 1, wherein the reservoir surface is impermeable and non-porous.

4. The sampling device of claim 1, wherein the reservoir surface has an effective surface area of less than 150% of the reservoir surface area.

5. The sampling device of claim 1, wherein the reservoir surface is composed of fused particles.

6. The sampling device of claim 1, wherein the reservoir surface is a self-assembled monolayer.

7. The sampling device of claim 1, wherein the reservoir surface material is a metallic material.

8. The sampling device of claim 7, wherein the metallic material surface includes gold, silver, copper, or combinations thereof.

9. The sampling device of claim 1, wherein the reservoir surface material is a metal oxide.

10. The sampling device of claim 1, wherein the reservoir surface material includes silica.

11. The sampling device of claim 1, wherein the reservoir surface material is a polymer.

12. The sampling device of claim 1, wherein the reservoir surface material is intermixed with a binder.

13. The sampling device of claim 1, wherein the substrate is composed of the reservoir surface material.

14. The sampling device of claim 1, wherein the reservoir surface is functionalized with at least one capture antibody for mass spectrometry biosensing.

15. The sampling device of claim 1, wherein the reservoir surface is functionalized with polypyrrole.

16. The sampling device of claim 1, wherein the reservoir surface is functionalized with a moiety having an alkyl chain having a chain length of 2 to 22 $CH_2$ units.

17. The sampling device of claim 1, wherein the Taylor cone emitter portion includes a tapering tip extending from the substrate.

18. The sampling device of claim 1, wherein the reservoir surface is a concave surface.

19. The sampling device of claim 1, wherein the reservoir surface is a planar surface.

20. The sampling device of claim 1, wherein the reservoir surface includes at least one flow modification surface feature.

* * * * *